UNITED STATES PATENT OFFICE.

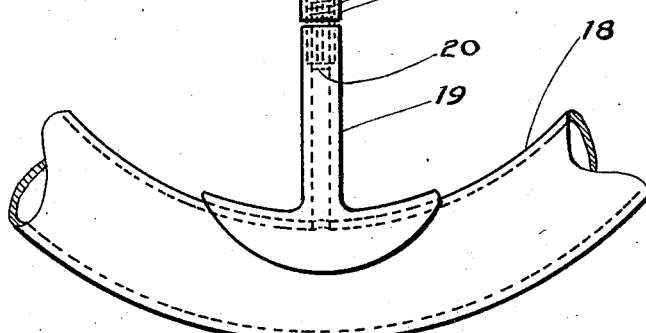

MARTIN J. CLAUSEN, OF SEATTLE, WASHINGTON.

VALVE-LEAK INDICATOR.

1,420,909.　　　Specification of Letters Patent.　　Patented June 27, 1922.

Application filed November 15, 1920. Serial No. 424,138.

*To all whom it may concern:*

Be it known that I, MARTIN J. CLAUSEN, a citizen of the United States, and residing at Seattle, in the county of King and State of Washington, have invented certain new and useful Improvements in Valve-Leak Indicators, of which the following is a specification.

This invention relates to valve leak indicators.

An object of the invention is to provide an indicator as herein described whereby the leak in a valve of a pneumatic tire can easily be detected.

These and other objects will appear as my invention is hereinafter more fully set forth in the following specification, shown in the accompanying drawings and finally pointed out in the appended claims.

In the drawings:

Fig. 1 is a front view of the invention.

Fig. 2 is a fragmentary view of a pneumatic tube with a valve stem attached thereto and a valve shown therein and the invention removably attached to the said valve stem.

Referring now more particularly to the drawings:

Reference numeral 1 indicates a glass tube whose one end is formed with a thread 2. Rigidly mounted in the other end of the said tube in a leakproof manner is a circular metal member 3 formed with a hole 4 and a conical seat 5 at the upper extremity of said hole, the lower end of the said circular member 4 being reduced as at 6 and formed with a threaded hole 7 it being understood that there is communication between the hole 4 and the said threaded hole.

Threadedly mounted on the threads 2 of the tube 1 is a cap 8, said cap being formed with a boss 9; said boss being formed with internal threads 10. 11 is a valve formed with a suitable gripping means 12 and a thread 13 on its one end and the lower portion of said valve adjacent the said screw portion being reduced as at 14 the extremity thereof being formed conical, generally shown at 15.

16 indicates water contained within the tube 1 shown in Fig. 2. 17 indicates air bubbles in the said water. 18 indicates a section of a pneumatic tube, with a valve stem 19 attached thereto, a valve 20 being yieldingly mounted therein.

In the operation of a valve leak indicator as herein described, it is possible to fill the interior of the tube 1 with water by unscrewing the valve 11 so as to allow the said water to pass into the interior of the said tube through the hole 4. When a necessary quantity of water has passed into the said tube it is kept from escaping by screwing the valve 11 downwardly until the conical point 15 has moved into engagement with the seat 5. It of course now can be understood that it is impossible for the water to escape from the interior of said tube. To discover a valve leak in a pneumatic tube is sometimes very difficult. With my invention removably attached to a valve stem of a pneumatic tire and the valve 11 subsequently being moved out of engagement with the seat 5 as shown in Fig. 2, it can be seen that the water contained within the said device is free to run down into the valve stem surrounding the valve 20.

It can now be understood that if there is any leak due to an imperfect valve that the air escaping by the said valve will cause air bubbles as indicated at 17 in Fig. 2, to move upwardly in the water contained within the said tube.

While I have shown a particular form of embodiment of my invention, I am aware that many minor changes therein will readily suggest themselves to others skilled in the art without departing from the spirt and scope of my invention. I therefore desire to avoid being limited to the exact form shown and described.

Having described my invention what I claim as new and desire to protect by Letters Patent, is:—

1. A valve leak indicator, comprising a tube, a plug mounted in one end of the tube formed with an opening, a conical seat at the inner end thereof and adapted to fit over a valve stem, a cap on the other end of the tube, and a valve threaded in the cap having a conical end portion adapted to engage the conical seat for retaining fluid in the tube.

2. A valve leak indicator, comprising a tubular member, a plug mounted in one end thereof formed with a projection and an opening through the plug and projection formed into a valve seat at the inner end thereof, the opening in the projection being
5 threaded for engagement with a valve stem, a cap secured to the other end of the tubular member, and a valve having threaded engagement with the cap formed with a projection adapted in one position to fit said valve seat in the plug for retaining 10 liquid in the tubular member.

In testimony whereof I affix my signature in the presence of two witnesses.

MARTIN J. CLAUSEN.

Witnesses:
OSCAR J. HANSON,
SUZANNE MCLAUGHLIN.